United States Patent
Hartmann et al.

[11] 3,959,553
[45] May 25, 1976

[54] MAGNETIC DISCS HAVING METAL SUPPORT AND A NON-MAGNETIC LAYER

[75] Inventors: Job Werner Hartmann, Ludwigshafen; Werner Ostertag; Rudolf Sand, both of Willstaett; Dieter Schaefer, Ludwigshafen; Hans Joerg Hartmann, Freinsheim, all of Germany

[73] Assignee: BASF Aktiengesellschaft, Ludwigshafen (Rhine), Germany

[22] Filed: Nov. 9, 1973

[21] Appl. No.: 414,331

[30] Foreign Application Priority Data
Nov. 10, 1972   Germany............................ 2255028

[52] U.S. Cl................................ 428/329; 427/130; 427/131; 428/402; 428/418; 428/900
[51] Int. Cl.²......................................... H01F 10/00
[58] Field of Search........... 117/239, 236, 237, 238, 117/240; 427/130, 131; 428/329, 402, 418, 900

[56] References Cited
UNITED STATES PATENTS

| | | | |
|---|---|---|---|
| 2,819,186 | 1/1958 | Franck................................ | 117/239 |
| 3,055,770 | 9/1962 | Sankuer et al...................... | 117/239 |
| 3,681,225 | 8/1972 | Genma et al. .................. | 117/239 X |
| 3,687,725 | 8/1972 | Hartmann et al................... | 117/235 |
| 3,733,215 | 5/1973 | Paesschen et al............... | 117/239 X |

*Primary Examiner*—Bernard D. Pianalto
*Attorney, Agent, or Firm*—Johnston, Keil, Thompson & Shurtleff

[57] ABSTRACT

The invention relates to magnetic discs in which first a non-magnetic intermediate layer and then the magnetic coating are applied by conventional methods to an aluminum disc. The intermediate layer applied to the non-magnetic metallic carrier disc is a hard non-magnetic coating which can be polished and which consists of a dispersion of a pulverulent mixture of finely divided inorganic non-magnetic pigments having a Mohs' hardness of at least 7 in a binder which can be cured and which provides firm cohesion of the pigment particles and good adhesion thereof to the non-magnetic base disc, the pigment mixture containing at least 3 percent by weight of corundum powder having a particle size of from about 1 to $20\mu$. Magnetic discs with very thin magnetic coatings which possess good magnetic and mechanical properties and whose thickness varies only minimally are thus produced in a simple manner.

6 Claims, No Drawings

MAGNETIC DISCS HAVING METAL SUPPORT AND A NON-MAGNETIC LAYER

The invention relates to an improved process for the manufacture of magnetic discs which is especially suitable for the manufacture of recording discs having very thin magnetic coatings.

Magnetic recording discs, also referred to simply as magnetic discs, are used, for example, in magnetic recording equipment such as is described in U.S. Pat. No. 3,176,281. It is known that the magnetic discs can be manufactured by spraying or spin-coating a dispersion of a magnetic pigment in a binder onto the non-magnetic metallic bases which are in most cases disc-shaped, for example aluminum discs; suitable dispersions for the manufacture of the magnetic coating are described in, for example, U.S. Pat. Nos. 2,914,480 and 3,058,844. In use, the magnetic discs rotate at high speed and co-operate with a magnetic head which travels, in accordance with aerodynamic principles, at a small distance from the magnetic disc, on a cushion of air between the latter and the head. The conditions under which such magnetic discs are used demand both a very high degree of physical stability and good magnetic properties. This applied all the more, the thinner the magnetic coating of the magnetic discs. Whilst the first generation of magnetic discs had magnetic coatings as thick as about 6 $\mu$, magnetic discs with magnetic coating thicknesses of only about 1 to 2 $\mu$ are demanded nowadays, since these offer a higher recording density, that is to say they can accommodate more information per unit area. On the other hand, very thin magnetic coatings are much more difficult to produce without appreciable variations in coating thickness and without flaws, since even scratches in the aluminum discs or in the magnetic coating suffice to cause variations in magnetic properties or unwanted signals.

An object of the present invention is to provide a simple method of manufacturing magnetic discs even with very thin magnetic coatings, which exhibit good magnetic and good mechanical properties and only minimal variations in the thickness of the magnetic coating.

We have now found that magnetic discs can be manufactured very advantageously by coating a non-magnetic metallic base disc with a dispersion of a finely divided magnetic pigment in a solution of a binder in an organic solvent and converting the coating into a solid hard magnetic coating of predetermined hardness by drying and curing and subsequently grinding and/or polishing the magnetic coating, if the non-magnetic metallic base disc prior to application of the magnetic coating, is provided with a hard and polishable non-magnetic intermediate layer of a pulverulent mixture of finely divided inorganic non-magnetic pigments having a Mohs' hardness of at least 7, which mixture contains at least 3 percent by weight, based on the pigment mixture, of corundum powder having a particle size of from about 1 to 20 $\mu$, dispersed in a curable binder which provides firm cohesion of the pigment particles and good adhesion thereof to the non-magnetic base disc, the intermediate layer preferably exhibiting a slight surface roughness after it has been hardened and its surface has been polished.

We have also found that particularly good magnetic discs are obtained if the intermediate layer additionally contains a specific amount of finely divided cerium dioxide, $CeO_2$. Finally, we have also found that the magnetic discs obtained are improved yet further if the magnetic coating also contain finely divided corundum powder and/or cerium dioxide powder dispersed in the binder.

Conventional non-magnetic metallic bases discs of conventional sizes and thicknesses, especially aluminum discs or aluminum alloy discs, can be used for the process according to the invention for the manufacture of magnetic recording discs. For the manufacture of magnetic discs with thin magnetic coatings, the surface of the base discs should be polished and, in the preferred embodiment, should have a center line average value $R_a$ of about 0.4 to 0.5 $\mu$ and a peak-to-valley height $R_t$ of about 2.5 to 3 $\mu$.

According to the invention, the intermediate layer which is preferably applied to both sides of the base disc and is based on a dispersion of a pulverulent mixture of different inorganic non-magnetic pigments in a binder, contains a mixture of finely divided inorganic non-magnetic pigments having a Mohs' hardness of at least 7 and comprises at least 3 percent by weight and in general not more than 20 percent by weight, but preferably 5 to 8 percent by weight, of corundum powder having a particle size of from about 1 to 20 $\mu$.

Pulverulent quartz, $\alpha$-$Fe_2O_3$, silicon carbide chromium(III) oxide, $Cr_2O_3$, or diamond may be mentioned as examples of finely divided non-magnetic inorganic pigments having a Mohs' hardness of at least 7 which can be used together with corundum powder. We have found that, surprisingly, the use of finely divided cerium dioxide, $CeO_2$, which has the same type of structure as calcium fluoride, in combinatiion with corundum powder as the non-magnetic pigment mixture gives magnetic discs with particularly advantageous physical properties. Our experiments have also shown that it is not necessary to use cerium dioxide, $CeO_2$, in the pure isolated form; instead, a commercially available intermediate product used for obtaining pure cerium dioxide, for example monazite sand, namely a cerium powder whch contains at least 45 percent by weight of cerium dioxide, whilst the remainder consists, to all intents and purposes, of the oxides of other rare earth metals (lanthanides) occurring, inter alia in cerite earths, — such an intermediate product being used, for example, as a polishing agent for glasses — can be used extremely effectively as a non-magnetic pigment powder in accordance with the invention. In the preferred embodiments of the process, the mixture of non-magnetic inorganic pigment powders which is used for the intermediate layer consists of 5 to 12 percent by weight of corundum powder and 95 to 88 percent by weight of cerium dioxide or of the abovementioned cerium powder or 5 to 10 percent by weight of corundum powder and at least 20 percent by weight of cerium dioxide or at least 40 percent by weight of the abovementioned cerium powder (containing at least 45 percent by weight of cerium dioxide). The size of the pigment particles is generally about 0.5 to 1.2 times the predetermined final thickness of the intermediate layer. In some cases it is of advantage if the average particle size is of the same order to magnitude as the layer thickness.

In general, the intermediate layer advantageously contains about 50 to 75 percent by weight, preferably about 60 to 70 percent by weight, of the mixtures of non-magnetic inorganic hard pigments used according to the invention, the figures being based on the sum of the amount of the pigment powder and of the binder.

Curable binders which can be used to produce the intermediate layer include all binders which adhere sufficiently firmly to the metallic base discs used, such as aluminum discs, possess sufficient binding power for the non-magnetic pigment powder and give, after curing and/or baking the layer of the dispersion of pigment powders in the binder, a tough intermediate layer having a hard surface which can be ground and polished. The latter aspect is very important for obtaining a surface having a small peak-to-valley height.

Binders based on curable epoxy resins, i.e. curable compounds possessing reactive epoxy groups, are particularly suitable for use as the binders which are advantageously used in the form of their solutions or solutions of their components, for producing the intermediate layers. Polyglycidyl ethers of aliphatic and aromatic polyols, such as glycerol, 1,4-butanediol, tris(hydroxymethyl)-propane-(2,2), pentaerythritol, bisphenol A [bis-(4-hydroxyphenyl)-propane-(2,2)], bis-(-hydroxyphenyl)-methane and the like, which can be obtained by reaction of the polyols with epichlorhydrin and are commercially available as binders, are particularly suitable. They can be cured at elevated temperatures, for example by means of polyamines, polyaminoamides, curable, optionally plasticized phenolic resins of the resol type, curable urea-formaldehyde precondensates or curable melamine-formaldehyde precondensates, of which the methylol groups can also be etherified with lower alcohols. A very suitable binder has proved to be a mixture of a commercially available epoxy resin, prepared from bisphenol A and epichlorohydrin and having an epoxide equivalent weight of at least 2,000, and a precondensate of phenol or a $C_1$–$C_4$ alkylphenol and not less than a 2 to 3-fold molar amount of formaldehyde, which contains at least two methylol groups etherified with a $C_1$–$C_4$-alcohol, such as n-butyl alcohol or, preferably, allyl alcohol, per molecule. The triallyl ether of trimethylolphenol is a further example of such a precondensate. In general, about 60 to 80 parts by weight of the epoxy resin and about 20 to 40 parts by weight of the plasticized phenolic resin of the resol type are employed. The mixtures can be cured at temperatures from about 180° to 250°C.

Of course, conventional additives, for example dispersing agents or lubricants may be present in the layers in the conventional small amounts.

Solvents or solvent mixtures which can be used for the preparation and application of the pigment binders are the conventional volatile solvents used for binders, for example aromatic hydrocarbons, such as benzene, toluene or xylene, alcohols and glycols, such as propanol or butanol, or their esters or ethers, such as ethyl glycol acetate (ethylene glycol monoethyl ether monoacetate), ketones, such as acetone or methyl glycol acetate, or ethers, such as tetrahydrofuran or dioxane, as well as, of course, mixtures of such solvents.

To produce the dispersion, the mixture of the non-magnetic pigments, the curable binder and a sufficient amount of solvent is dispersed in a conventional manner, for example in a ball mill. Conventional methods can also be used for applying the dispersion to the base disc. A very suitable method has proved to be first to apply a layer of the dispersion to the slowly rotating carrier disc, (for example at a speed of about 100 to 500 r.p.m.), for example by spraying, giving a thickness of, for example, about 1 to about 3 mm, and then to adjust the thickness of the intermediate layer to the desired value, for example from 2 to 25 $\mu$, by rotating the disc at a higher speed, preferably at about 1,000 to 3,000 r.p.m. An example of an application technique which can be used is described in U.S. Pat. No. 2,913,246. In the preferred embodiment, the base discs are provided with the intermediate layer on both sides and thereafter with the magnetic coating.

When the coating process is over, the intermediate layer cured or baked. In this treatment, the coated base disc is advantageously heated at about 120°–250°C for ¼ to 1 hour; the curing temperature and curing time depend on the binder system used and can in the case of some binder systems be reduced by adding curing catalysts, for example acids, to the dispersion.

The baking step is advantageously followed by grinding and polishing of the surface of the baked intermediate layer to achieve the desired slight surface roughness which preferable corresponds to an $R_a$ value of 0.01 to 0.05 $\mu$ and an $R_t$ value of 0.01 to 0.1 $\mu$ after polishing. It has proved very advantageous to polish the surface of the intermediate layer with a polishing agent such as very fine diamond powder, boron carbide powder or similar finely divided abrasives in the form of a paste, preferably on felt discs and especially on discs of polyvinyl alcohol sponge as the carrier material, the rotating discs being pressed against the layer during polishing. The pressure used is in general at least 0.02 kg/cm$^2$ and preferably about 0.8 to 2.0 kg/cm$^2$. Liquids such as paraffin oils with boiling points of from about 120° to 240°C have proved to be suitable grinding fluids.

The peak-to-valley height of the surface of the intermediate layer is measured as laid down in DIN 4762.

The base discs, for example aluminum discs, which have thus been provided on one or, preferably, both sides with an intermediate layer about 1 to 10 $\mu$ thick, and preferably 1 to 5 $\mu$ thick, and exhibiting the desired slight surface roughness, can now be provided with a magnetic coating by coating them in a conventional manner with a liquid dispersion consisting of a finely divided magnetic pigment, a binder and a solvent; the coating can be applied in the same way as the intermediate layer.

The magnetic pigments employed are those conventionally used, such as magnetite and preferably acicular gamma-iron(III) oxide, having an average particle size of from about 0.1 to 2 $\mu$. The amount by weight of the magnetic pigments is generally 0.5 to 3 times, and preferably about 0.8 to 1.5 times, the weight of the binder used. Suitable binders are especially those mentioned for use in the intermediate layer provided they firmly bond the recording layer to the intermediate layer; the desired degeee of adhesion is obtained in most cases if binders similar to those employed in the intermediate layer are used, and can in every case be readily checked by a simple experiment. Curable binders are preferred which after the magnetic coating has been baked give a surface which can also be ground and polished, i.e., which give, in particular, a magnetic coating which can be ground and polished in the same way as has been described for the intermediate layer.

In many cases it is of advantage to mix the magnetic dispersion intimately, prior to coating, with finely divided non-magnetic pigments having a Mohs' hardness of at least 6 and preferably of at least 7; in general, these pigments are used in an amount of about 1 to 10 percent by weight, and in particular 2 to 4 percent by weight, of the amount of magnetic pigment and binder in the magnetic coating. Suitable non-magnetic pigments for this purpose are especially those mentioned in connection with the production of the non-magnetic intermediate layer and usable as abrasives, such as silicon carbide, boron carbide, aluminum oxide (corundum) or silicon dioxide.

Magnetic discs with particularly advantageous properties are obtained if the non-magnetic pigments used in the magnetic coating are corundum powder and/or pulverulent cerium dioxide of the same type of structure as calcium fluoride. We have found it advantageous to use a corundum powder having a particle size of about 3 to 15 $\mu$, in amounts of 2 to 4 percent by weight. The amount of cerium dioxide powder in the magnetic coating should be at least 2 percent by weight and preferably 2 to 5 percent by weight; the abovementioned percentages in each case are based on the sum of the amounts of magnetic pigment and binder in the magnetic coating.

The particle size of these non-magnetic pigments used in the magnetic coating is generally from about 0.5 to 2 times the thickness of the magnetic coating and preferably about 0.7 to 1.3 times the thickness of the magnetic coating, the final thickness of which is about 1 to 7 $\mu$, preferably about 1 to 4 $\mu$.

The dried and heated magnetic coating can then be ground and polished as mentioned above.

High-quality magnetic discs even with very thin magnetic coatings can be produced relatively simply by the process according to the invention. The discs are distinguished by particularly good resistance to repeated head landings in sustained operation, and also by good magnetic properties, and are especially suitable for high-density recordings.

The invention is further illustrated by the following Examples in which parts and percentages are by weight.

EXAMPLE 1

An aluminium disc having a thickness of 1.9 mm and an external diameter of 353 mm with a central hole 164 mm in diameter is coated, via a nozzle, with a dispersion of the following composition, whilst rotating slowly: 7.07 parts of a commercially available curable epoxy resin obtained from bisphenol A and epichlorohydrin and having an epoxide equivalent weight exceeding 2,000, 2.6 Parts of the triallyl ether of trimethylolphenol, 1.15 parts of corundum powder a particle size of from 3 to 15 $\mu$, 16.94 parts of commercially available $\alpha$-Fe$_2$O$_3$ (jeweller's rouge, acicular particles having an average particle size of less than 1.5 $\mu$), 0.25 part of a commercially available polydimethylsiloxane and 6.35 parts of cyclohexanone. The excess dispersion is flung off by increasing the speed of rotation of the carrier disc to about 2,500 r.p.m. and the layer is dried. The intermediate layer is then baked for about 1 hour at about 220°C and ground and polished with a diamond paste on a rotating felt disc and polyvinyl alcohol sponge disc, pressed against the layer. The resulting intermediate layer is 4.5 $\mu$ thick and its surface roughness is slightly less than 0.1 $\mu$, measured with the Perth-O-Meter manufactured by Fa. Perthen, Hanover, Germany.

The intermediate layer is so hard that in a test in which a stream of 0.3 to 0.8 mm quartz sand is allowed to run from a vessel through a tube having a length of 30 cm and an internal diameter of 5 mm and fall from a height of 50 cm onto the intermediate layer, mounted at an angle of 45° to the horizontal, and the time taken to wear away the intermediate layer to the base is measured and divided by the layer thickness, 17 seconds per $\mu$ were required. This is referred to hereinafter as the "quartz sand test".

To produce the magnetic coating, a dispersion prepared as follows is then applied to the polished and cleaned intermediate layer along the lines described above:

20.0 parts of an acicular gamma-iron(III) oxide having a particle length of about 0.8 $\mu$, 22.5 parts of a 50% solution of the abovementioned epoxy resin in a mixture of equal parts of toluene and ethyl glycol acetate, 0.4 part of the polydimethylsiloxane, 17.0 parts of ethyl glycol acetate and 20.0 parts of xylene are dispersed for 33 hours in a ball mill using porcelain balls of 8 mm diameter; 11.2 parts of the epoxy resin solution already referred to, 6.7 parts of the triallyl ether of trimethylolphenol and 1.6 parts of corundum powder having a particle size of from 3 to 15 $\mu$ are then mixed into the dispersion and the batch is dispersed for a further 32 hours. The dispersion is then filtered. The resulting coatings are heated for about one hour at about 220°C and then ground and polished as described above, giving magnetic coatings 1.6 to 2.2 $\mu$ in thick which exhibit extremely slight surface roughness.

If the magnetic discs obtained are run on a commercially available memory drive unit employing a floating magnetic head using a mechanical device to bring the magnetic head into contact with the same annular portion of the magnetic disc every two seconds, it is found that even after running for 15 minutes the magnetic discs manufactured according to the invention exhibit virtually no concentric scratches and only slight glossy areas.

EXAMPLE 2

The procedure of Example 1 is followed except that $\alpha$-Fe$_2$O$_3$ is replaced by cerium powder containing about 50% of cerium dioxide (the remainder being oxides of other rare earths). In the quartz sand test the time is 28 seconds/$\mu$.

When tested on a commercially available drive unit these magnetic discs show no concentric scratches and virtually no glossy areas after 15 minutes.

EXAMPLE 3

The procedure of Example 1 is followed except that in the production of the magnetic coating 1.6 parts of the cerium powder used for the production of the intermediate layer is employed instead of 1.6 parts of corundum powder. After grinding and polishing, the thickness of the magnetic coating is about 4 $\mu$. In the test carried out as described in Example 1, no scratches and virtually no glossy areas were found after 15 minutes.

We claim:

1. Magnetic discs manufactured by coating a non-magnetic metallic base disc with a dispersion of a finely divided magnetic pigment in a solution of a binder in an organic solvent and converting the coating into a solid hard magnetic coating of predetermined hardness by drying and curing and subsequently grinding and/or polishing the magnetic coating, wherein the non-magnetic metallic base disc has first been coated with a hard and polishable non-magnetic intermediate layer having a thickness of from 2 to 25 $\mu$ of a pulverulent mixture of finely divided inorganic non-magnetic pigments having a Mohs' hardness of at least 7, said mixture containing at least 3 percent by weight, based on the pigment mixture, of corundum powder having a particle size of from about 1 to 20 $\mu$, dispersed in a curable binder, said intermediate layer containing about 50 to 75 percent by weight of the mixture of finely divided non-magnetic pigments, based on the sum of the amounts of pigment and binder which provides firm cohesion of the pigment particles and good adhesion thereof to the non-magnetic base disc.

2. A disc as claimed in claim 1, wherein the pulverulent mixture of finely divided inorganic pigments contains at least 20 percent by weight of cerium dioxide, $CeO_2$.

3. A disc as claimed in claim 1, wherein the pulverulent mixture of finely divided inorganic pigments contains at least 40 percent by weight of a cerium powder which contains at least 45 percent by weight of cerium dioxide, $CeO_2$, The remainder of the cerium powder consisting essentially of oxides of rare earths.

4. A disc as claimed in claim 1, wherein the intermediate layer is about 1 eo 10 $\mu$ thick.

5. A disc as claimed in claim 1, wherein the curable binder of the intermediate layer consists predominantly of an epoxy resin.

6. A disc as claimed in claim 1, wherein the pulverulent mixture of finely divided inorganic pigments contains from 5 to 12 percent by weight of corundum powder and 88 to 95 percent Cerium dioxide, $CeO_2$, or Cerium powder which consists of at least 45 percent by weight of $CeO_2$ the remainder of the cerium powder consisting essentially of oxides or rare earths.

* * * * *